(12) United States Patent
Harral

(10) Patent No.: US 6,978,329 B1
(45) Date of Patent: Dec. 20, 2005

(54) PROGRAMMABLE ARRAY-BASED BUS ARBITER

(75) Inventor: Vance Harral, Erie, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 438 days.

(21) Appl. No.: 10/267,401

(22) Filed: Oct. 8, 2002

(51) Int. Cl.[7] .................. G06F 13/36; G06F 13/362; G06F 13/00; G06F 13/14
(52) U.S. Cl. .................. 710/116; 710/113; 710/107; 710/240; 710/241
(58) Field of Search .................. 710/36, 40, 49, 710/104, 113–114, 116, 121, 240–242, 244, 710/264, 123, 309; 370/462; 709/225; 711/150

(56) References Cited

U.S. PATENT DOCUMENTS

| | | | | |
|---|---|---|---|---|
| 4,438,489 A | * | 3/1984 | Heinrich et al. .......... 710/264 |
| 5,619,670 A | * | 4/1997 | Shindo .................... 711/202 |
| 5,884,051 A | * | 3/1999 | Schaffer et al. .......... 710/107 |
| 6,222,846 B1 | * | 4/2001 | Bonola et al. ............ 370/402 |
| 6,330,645 B1 | * | 12/2001 | Harriman ................. 711/151 |
| 6,411,218 B1 | * | 6/2002 | Johnson .................. 340/825.5 |
| 6,683,816 B2 | * | 1/2004 | Emmot et al. ............ 365/230.03 |
| 2003/0067832 A1 | * | 4/2003 | Emmot et al. ............ 365/230.03 |
| 2004/0001503 A1 | * | 1/2004 | Manter .................... 370/462 |
| 2004/0006662 A1 | * | 1/2004 | Chao ...................... 710/240 |

OTHER PUBLICATIONS

Chiueh et al. Design and Evaluation of A DRAM-based Shared Memory ATM Switch. The Association for Computing Machinery. 1997. pp 248-259. 0-89791-909-2/97/0006.*

* cited by examiner

Primary Examiner—Khanh Dang
Assistant Examiner—Thomas J. Cleary

(57) ABSTRACT

A bus arbiter for arbitrating bus access requests from N bus requestor devices. The bus arbiter comprises N one-hot registers, each one-hot register associated with a corresponding bus requester device. Each one-hot register contains N priority bits rank-ordered from a lowest priority bit to a highest priority bit. Only one priority bit is enabled to indicate a priority of the corresponding bus requester device. The bus arbiter compares the priority bits in each one-hot register with a plurality of request signals received from the bus requester devices and grants bus access to the highest priority bus requester device.

20 Claims, 4 Drawing Sheets

|     |   |   |   |   |
|-----|---|---|---|---|
| AR3 | 1 | 0 | 0 | 0 |
| AR2 | 0 | 1 | 0 | 0 |
| AR1 | 0 | 0 | 1 | 0 |
| AR0 | 0 | 0 | 0 | 1 |

FIG. 4A

|     |   |   |   |   |
|-----|---|---|---|---|
| AR3 | 0 | 0 | 0 | 1 |
| AR2 | 1 | 0 | 0 | 0 |
| AR1 | 0 | 1 | 0 | 0 |
| AR0 | 0 | 0 | 1 | 0 |

FIG. 4B

PRIORITY ENCODER 340 TRUTH TABLE

| INPUTS | OUTPUTS |
|--------|---------|
| 0 0 0 0 | 0 0 0 0 |
| 0 0 0 1 | 0 0 0 1 |
| 0 0 1 X | 0 0 1 0 |
| 0 1 X X | 0 1 0 0 |
| 1 X X X | 1 0 0 0 |

FIG. 5

PROGRAMMABLE ARRAY-BASED BUS ARBITER

TECHNICAL FIELD OF THE INVENTION

The present invention is generally directed to system-on-a-chip (SOC) devices and other large integrated circuits (ICs) and, in particular, to a programmable array-based bus arbiter for use in a SOC device.

BACKGROUND OF THE INVENTION

In recent years, there have been great advancements in the speed, power, and complexity of integrated circuits, such as application specific integrated circuit (ASIC) chips, random access memory (RAM) chips, microprocessor (uP) chips, and the like. These advancements have made possible the development of system-on-a-chip (SOC) devices. A SOC device integrates into a single chip many of the components of a complex electronic system, such as a wireless receiver (i.e., cell phone, a television receiver, and the like). SOC devices greatly reduce the size, cost, and power consumption of the system.

SOC devices typically employ one or more shared data buses to transfer information between their various subsystems. Examples of these include commercial standards, such as ARM's AMBA bus, and National Semiconductor's Geodelink Bus, as well as a variety of other proprietary solutions. In most of these systems, each device coupled to the data bus is capable of acting as a bus master. Any data bus (or communication bus) that has multiple masters must also contain a bus arbiter that grants bus access to a single requester in the event of request conflicts.

There are many algorithms for determining which of multiple requesting devices is given priority to act as bus master. Examples include fixed priority, random, round-robin, and the like. However, it is difficult to determine in advance the best algorithm for a given application. In many instances, the quality of the arbitration algorithm depends on the program code that is being executed. In fact, different portions of the code of the same program may require different arbitration algorithms in order to produce the most efficient results.

As a result, many arbiter implementations are little more than a best-guess estimate of the optimum arbitration algorithm. If the arbitration algorithm proves to be unacceptable after the design is implemented in silicon, the integrated circuit must be re-designed. This is a costly and ineffective approach.

Therefore, there is a need in the art for improved bus architectures that are capable of implementing the optimum arbitration algorithm for a wide variety of applications. In particular, there is a need for a bus arbiter that implements adaptable arbitration algorithms. More particularly, there is a need for a bus arbiter that implements a reprogrammable algorithm that may be changed during execution of an application program.

SUMMARY OF THE INVENTION

The present invention comprises a bus arbiter that is controlled by an N×N-bit array, where N is the number of requesters (i.e., bus devices) connected to the bus. The N×N array comprises N shift registers, each of which contains N priority bits (or N control bits). Each shift register determines the priority of one of the N requesters and is programmed with a "one-hot" value, wherein one and only one priority bit is enabled (e.g., set to Logic 1) and the remaining N−1 priority bits in each shift register are disabled (e.g., set to Logic 0).

The priority bits in each register are rank ordered from a lowest priority bit (i.e., least significant bit (LSB)) to a highest priority bit (i.e., most significant bit (MSB)). No two shift registers have the same priority bit enabled. A block of AND gates ANDs the request lines with the corresponding array elements to produce a set of "request vectors". The request vectors are then ORed together and fed into a priority encoder. The priority encoder determines which shift register has the highest priority and these results are used to generate an acknowledgment signal that is sent to the highest priority requester.

To address the above-discussed deficiencies of the prior art, it is a primary object of the present invention to provide, a bus arbiter for arbitrating bus access requests from N bus requester devices. According to an advantageous embodiment of the present invention, the bus arbiter comprises: 1) N one-hot registers, each of the N one-hot registers associated with a corresponding one of the N bus requester devices, wherein the each of the N one-hot registers contains N priority bits rank-ordered from a lowest priority bit to a highest priority bit, and wherein only one of the N priority bits is enabled to indicate a priority of the corresponding one of the N bus requester device; and 2) N AND gate arrays, each of the N AND gate arrays associated with a corresponding one of the N one-hot registers, wherein the each AND gate array comprises N two-input AND gates, is each of the N two-input AND gates having 1) a first input coupled to one of N priority bits of the corresponding one of the N one-hot registers and 2) a second input coupled to a request signal associated with the corresponding one of the N bus requester devices, and wherein the each AND gate array produces a request vector comprising N rank-ordered bits such that only one of the N rank-ordered bits of each AND gate array is enabled when the request line is enabled.

According to one embodiment of the present invention, each enabled priority bit in each of the N one-hot registers has a different priority rank than the other enabled priority bits.

According to another embodiment of the present invention, the bus arbiter further comprises N OR gates, each of the N OR gates having N inputs and an output, wherein each of the N OR gates has one input coupled to one of the N rank-ordered bits from each of the N AND gate arrays such that all N inputs of each OR gate receive N outputs having the same rank ordering from the N AND gate arrays.

According to still another embodiment of the present invention, the bus arbiter further comprises a priority encoder having N inputs and N outputs, wherein each of the N priority encoder inputs is coupled to an output of one of the N OR gates.

According to yet another embodiment of the present invention, the priority encoder determines which of the N OR gate outputs are enabled and enables only one of the N priority encoder outputs corresponding to a highest priority one of the enabled OR gate outputs.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts:

FIGS. 4A and 4B illustrate a round robin priority algorithm implemented by the programmable bus arbiter according to the principles of the present invention;

FIG. 5 is a truth table for the priority encoder in the bus arbiter according to the principles of the present invention.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processing device.

Figure 1:
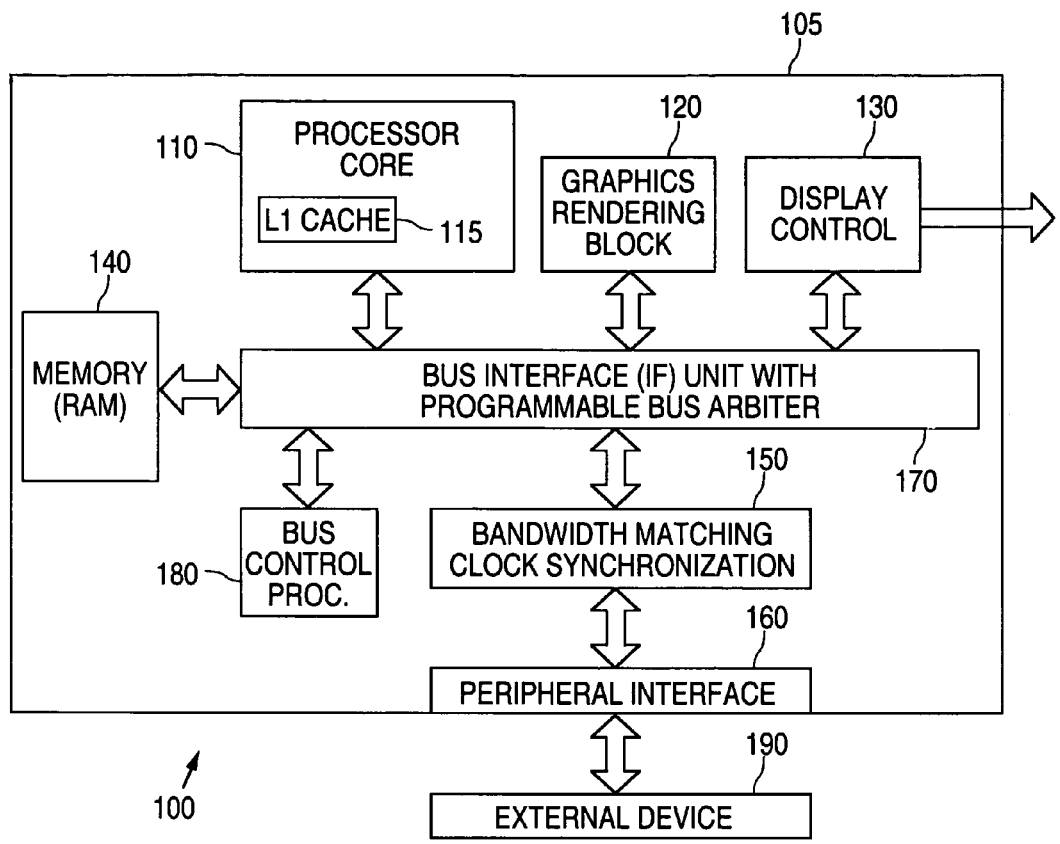
FIG. 1 illustrates a data processing system containing a bus interface unit with a programmable bus arbiter according to one embodiment of the present invention.

FIG. 1 illustrates processing system 100, which contains bus interface (IF) unit 170 having a programmable bus arbiter according to the principles of the present invention. According to an exemplary embodiment of the present invention, processing system 100 may be implemented as exemplary system-on-a-chip (SOC) device 105. SOC device 105 is a single integrated circuit comprising processor core 110, graphics rendering block 120, (optional) display control circuit 130, memory 140, bandwidth matching-clock synchronization interface 150, peripheral interface 160, bus interface (IF) unit 170, and bus control processor 180. Optionally, processor core 110 may contain internal level one (L1) cache 115. Peripheral interface 160 communicates with external device 190.

Processing system 100 is shown in a general level of detail because it is intended to represent any one of a wide variety of electronic products, particularly consumer appliances. Display controller 130 is described above as optional because not all end-products require the use of a display. Likewise, graphics rendering block 120 may also be optional.

For example, processing system 100 may be a printer rendering system for use in a conventional laser printer. Processing system 100 also may represent selected portions of the video and audio compression-decompression circuitry of a video playback system, such as a video cassette recorder or a digital versatile disk (DVD) player. In another alternative embodiment, processing system 100 may comprise selected portions of a cable television set-top box or a stereo receiver.

Bus IF unit 170 provides high-speed, low latency communication paths between the components coupled to bus IF unit 170. Each component coupled to bus IF unit 170 is capable of initiating or servicing data requests via bus IF unit 170. In addition, bus IF unit 170 may provide a diagnostic bus, power management controls, clocks, reset signals, and a scan interface.

Bandwidth matching-clock synchronization interface 150 comprise a queue that bridges ports on bus IF unit 170 that have different widths or different frequencies, or both. Bus control processor 180 controls certain operations of bus IF unit 170 related to clock timing, power management, and diagnostic features. Advantageously, bus control processor 180 may be used to reprogram the programmable bus arbiter in bus IF unit 170 according to the principles of the present invention. Peripheral interface 160 is a bus device used for chip-to-chip communication between SOC device 105 and an external peripheral device, such as external device 190.

Figure 2:
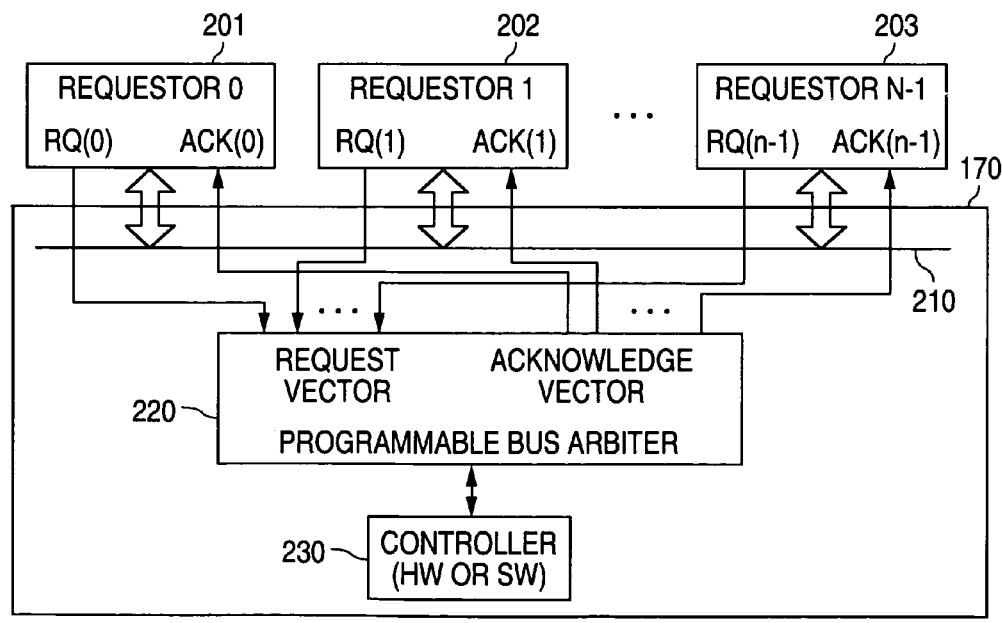
FIG. 2 illustrates the bus interface unit with a programmable arbiter in greater detail according to an exemplary embodiment of the present invention.

FIG. 2 illustrates in greater detail bus interface unit 170, which comprises programmable bus arbiter 220 to an exemplary embodiment of the present invention. Bus IF unit 170 comprises data bus 210, programmable bus arbiter 220 and controller 230. Controller 230 may be controlled by bus control processor 180 and may comprise a hardware controller or a software controller. In FIG. 2, processor core 110, graphics rendering block 120, display control circuit 130, memory 140, bandwidth matching-clock synchronization interface 150, peripheral interface 160, and bus control processor 180 are all represented generically as N bus requesters, including exemplary bus requesters 201, 202 and 203. Bus requester 201 is arbitrarily labeled Requestor 0, bus requester 202 is arbitrarily labeled Requestor 1, and bus requester 203 is arbitrarily labeled Requestor N−1.

Each of the N bus requesters requests access to data bus 210 by setting its request (RQ) line to Logic 1. Exemplary Requestor 0 requests access to data bus 210 via the RQ(0) request line. Exemplary Requestor 1 requests access to data bus 210 via the RQ(1) request line. Exemplary Requestor N−1 requests access to data bus 210 via the RQ(N−1) request line. The combined request lines form a Request Vector to programmable bus arbiter 220.

Each of the N bus requesters receives an Acknowledge (ACK) signal from programmable bus arbiter 220 when the bus requester receives access to data bus 210. Exemplary Requestor 0 receives the ACK(0) signal. Exemplary Requestor 1 receives the ACK(1) signal. Exemplary Requestor N−1 receives the ACK(N−1) signal. The combined Acknowledge signals from programmable bus arbiter 220 form an Acknowledge Vector.

Figure 3A:
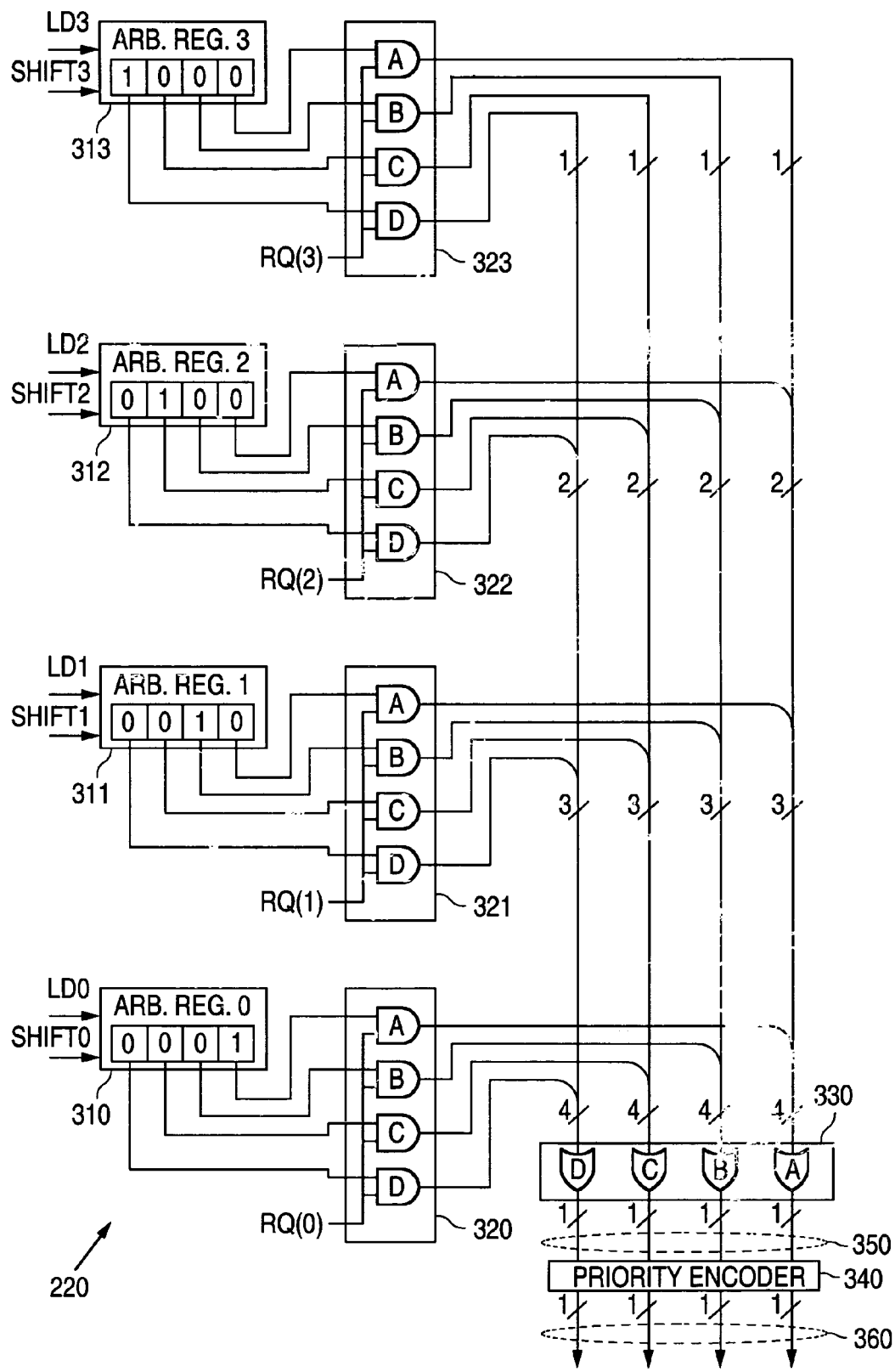
FIGS. 3A and 3B illustrate portions of the programmable bus arbiter according to one embodiment of the present invention.
Figure 3B:
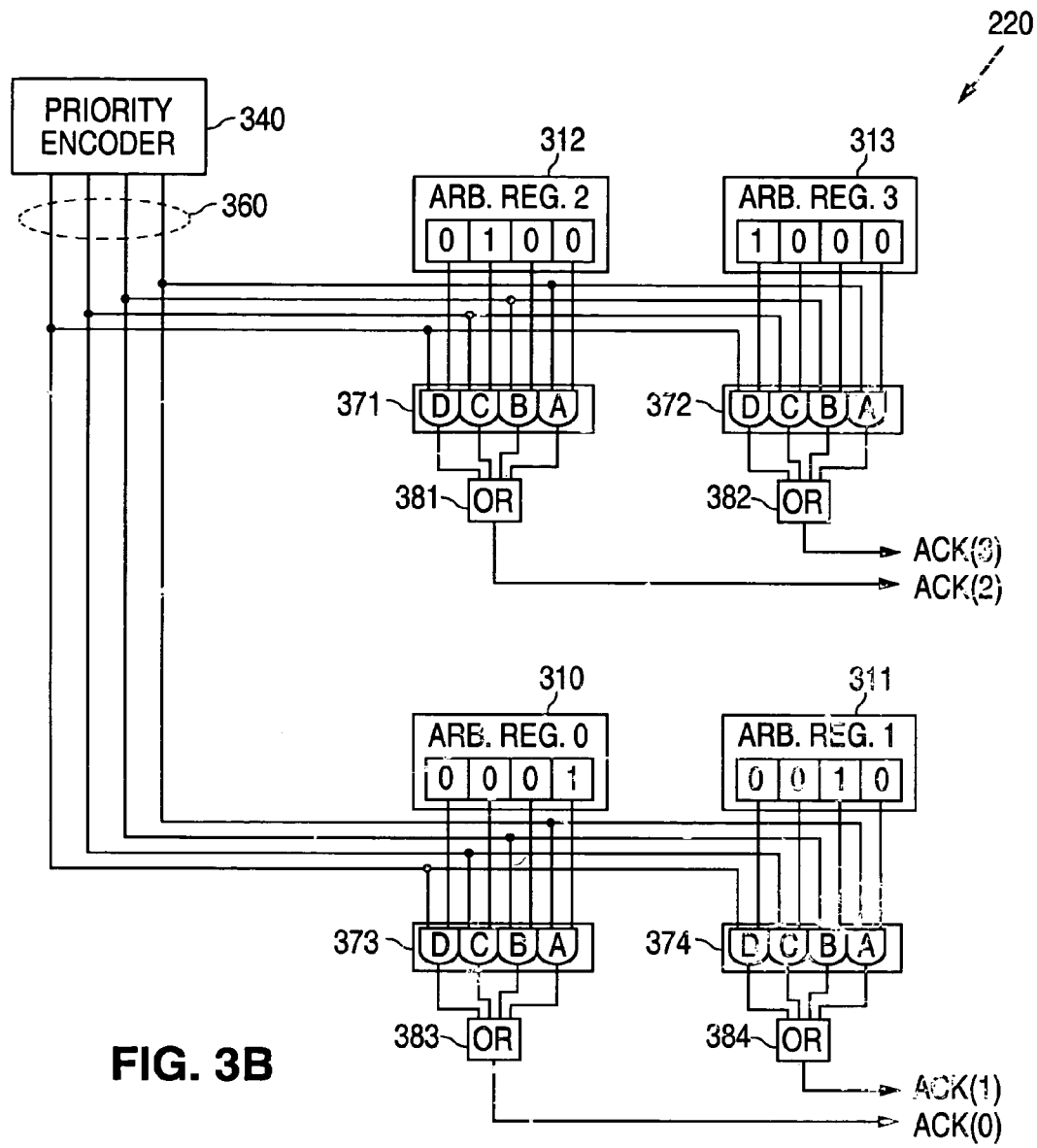

FIGS. 3A and 3B illustrate selected portions of programmable bus arbiter 220 in bus IF unit 170 according to one embodiment of the present invention. Bus arbiter 220 comprises shift registers 310–313, AND gate arrays 320–323, OR gate array 330, priority encoder 340, AND gate arrays 371–374 and OR gates 381–384. For the sake of simplicity in explaining the principles of a programmable bus arbiter according to the principles of the present invention, it is assumed that there are four (i.e., N=4) requesters coupled to bus arbiter 220. Thus, a 4×4-bit array formed by shift registers is used to control the operation of bus arbiter 220. However, it should be understood that this is by way of illustration only and other N×N-bit arrays may be implemented where N is greater than four or less than four.

Bus arbiter 220 comprises four (N=4) shift registers 310, 311, 312 and 313, which are labeled Arbiter Register 0, Arbiter Register 1, Arbiter Register 2, Arbiter Register 3, respectively. Each one of Arbiter Register 0, Arbiter Register 1, Arbiter Register 2, and Arbiter Register 3 comprises four (N=4) priority bits that determine the priority of a corresponding bus requester. For example, the four priority bits in Arbiter Register 3 contain the priority bits for Requestor 3, the four priority bits in Arbiter Register 2 contain the priority bits for Requestor 2, the four priority bits in Arbiter Register 1 contain the priority bits for Requestor 1, and the four priority bits in Arbiter Register 0 contain the priority bits for Requestor 0.

The priority bits in each arbiter register are rank ordered from lowest priority bit (i.e., least significant bit (LSB)) to highest priority bit (i.e., most significant bit (MSB)). One and only one of the priority bits in each arbiter register is enabled (e.g., set to Logic 1) and the remaining N−1 priority bits are disabled (e.g., set to Logic 0). This is a "one-hot" configuration and each arbiter register may be referred to as a "one-hot register." Thus, in FIG. 3A, the Requestor 3 associated with Arbiter Register 3 has the highest priority, the Requestor 2 associated with Arbiter Register 2 has the second highest priority, the Requestor 1 associated with Arbiter Register 2 has the third highest priority, and the Requestor 0 associated with Arbiter Register 0 has the lowest priority.

Each of the priority bits in Arbiter Register 3 is fed to one of the four AND gates in AND gate array 323. AND gate D of AND gate array 323 ANDs together the highest priority bit and the request signal RQ(3) from Requestor 3. AND gate C of AND gate array 323 ANDs together the second highest priority bit and the request signal RQ(3) from Requestor 3. AND gate B of AND gate array 323 ANDs together the third highest priority bit and the request signal RQ(3) from Requestor 3. Finally, AND gate A of AND gate array 323 ANDs together the lowest priority bit and the request signal RQ(3) from Requestor 3. Thus, AND gates A, B, C, and D of AND gate array 323 produce four AND outputs, only one of which may be enabled (i.e., set to Logic 1), depending on the priority of Requestor 3. The four AND outputs of AND gates A, B, C, and D of AND gate array 323 form Request Vector 3. Since, in this example, Requestor 3 has the highest priority, only the output of AND gate D in AND gate array 323 is enabled when the request signal RQ(3) is enabled.

Arbiter Register 2 and AND gate array 322 are configured in a manner similar to Arbiter Register 3 and AND gate array 323. Thus, AND gates A, B, C, and D of AND gate array 322 produce four AND outputs, only one of which may be enabled, depending on the priority of Requestor 2. The four AND outputs of AND gates A, B, C, and D of AND gate array 322 form Request Vector 2. Since, in this example, Requestor 2 has the second highest priority, only the output of AND gate C in AND gate array 322 is enabled when the request signal RQ(2) is enabled.

Arbiter Register 1 and AND gate array 321 are configured in a manner similar to Arbiter Register 3 and AND gate array 323. Thus, AND gates A, B, C, and D of AND gate array 321 produce four AND outputs, only one of which may be enabled, depending on the priority of Requestor 1. The four AND outputs of AND gates A, B, C, and D of AND gate array 321 form Request Vector 1. Since, in this example, Requestor 1 has the third highest priority, only the output of AND gate B in AND gate array 321 is enabled when the request signal RQ(1) is enabled.

Finally, Arbiter Register 0 and AND gate array 320 are configured in a manner similar to Arbiter Register 3 and AND gate array 323. Thus, AND gates A, B, C, and D of AND gate array 320 produce four AND outputs, only one of which may be enabled, depending on the priority of Requestor 0. The four AND outputs of AND gates A, B, C, and D of AND gate array 320 form Request Vector 0. Since, in this example, Requestor 0 has the lowest priority, only the output of AND gate A in AND gate array 320 is enabled when the request signal RQ(0) is enabled.

OR gate A in OR gate array 330 has four inputs coupled to the four AND gate A outputs of AND gate arrays 320–323. OR gate B in OR gate array 330 has four inputs coupled to the four AND gate B outputs of AND gate arrays 320–323. OR gate C in OR gate array 330 has four inputs coupled to the four AND gate C outputs of AND gate arrays 320–323. OR gate D in OR gate array 330 has four inputs coupled to the four AND gate D outputs of AND gate arrays 320–323. The four outputs of OR gates A, B, C and D in OR gate array 330 comprise a Unified Request Vector Transform (URTF).

The Unified Request Vector Transform (URTF) is the input to priority encoder 340. FIG. 5 is a truth table for priority encoder 340 in exemplary bus arbiter 220 according to the principles of the present invention. In the truth table, the output of OR gate D of OR gate array 330 is the highest priority input bit (most significant bit) of the URTF and the output of OR gate A of OR gate array 330 is the lowest priority input bit (least significant bit) of the URTF.

As the truth table in FIG. 4 illustrates, if the output of OR gate D of OR gate array 330 (i.e., highest priority bit in URTF) is Logic 1 (fifth row of truth table), the values of the remaining three outputs of OR gates B, C, and D of OR gate array 330 are irrelevant. These "don't care" states are indicated by an X in the truth table (i.e., [1XXX] input). The corresponding 4-bit output of priority encoder 340 is 1000.

If the output of OR gate D of OR gate array 330 is Logic 0 and the output of OR gate C of OR gate array 330 is Logic 1 (fourth row of truth table), the values of the remaining two outputs of OR gates C and D of OR gate array 330 are irrelevant (i.e., [01XX] input). The corresponding 4-bit output of priority encoder 340 is 0100.

Similarly, if the outputs of OR gates A and B of OR gate array 330 are Logic 0 and the output of OR gate C of OR gate array 330 is Logic 1 (third row of truth table), the values of the OR gate D output is irrelevant (i.e., [001X] input). The corresponding 4-bit output of priority encoder 340 is 0010.

Finally, if the outputs of OR gates A, B and C of OR gate array 330 are Logic 0 and the output of OR gate D of OR gate array 330 is Logic 1 (second row of truth table—[0001] input), the corresponding 4-bit output of priority encoder 340 is 0001.

As shown in FIG. 3B, the 4-bit output of priority encoder 340 is then ANDed with the contents of Arbiter Register 3, Arbiter Register 2, Arbiter Register 1, and Arbiter Register 0 by AND gate arrays 371, 372, 373 and 374.

AND gate D of AND gate array 372 ANDs together the highest priority bit in Arbiter Register 3 and the highest priority bit in the 4-bit output of priority encoder 340. AND gate C of AND gate array 372 ANDs together the second highest priority bit in Arbiter Register 3 and the second highest priority bit in the 4-bit output of priority encoder 340. AND gate B of AND gate array 372 ANDs together the third highest priority bit in Arbiter Register 3 and the third highest priority bit in the 4-bit output of priority encoder 340. Finally, AND gate A of AND gate array 372 ANDs together the lowest priority bit in Arbiter Register 3 and the lowest priority bit in the 4-bit output of priority encoder 340. Thus, one and only one of the outputs of AND gate array 372 can be enabled (e.g., set to Logic 1), and it will be so only when the output of the priority encoder matches the value in Arbiter Register 3. The four outputs of AND gates A, B, C, and D of AND gate array 372 are then ORed together by 4-input OR gate 382 to produce the ACK(3) signal that is sent to Requestor 3.

The ACK(2), ACK(1) and ACK(0) signals are generated in an analogous manner. AND gate array 371 and 4-input OR gate 381 operate on the 4-bit output of priority encoder 340 and four priority bits in Arbiter Register 2 to produce the ACK(2) signal that is sent to Requestor 2. AND gate array 374 and 4-input OR gate 384 operate on the 4-bit output of priority encoder 340 and four priority bits in Arbiter Register 1 to produce the ACK(1) signal that is sent to Requestor 1. AND gate array 373 and 4-input OR gate 383 operate on the 4-bit output of priority encoder 340 and four priority bits in Arbiter Register 0 to produce the ACK(0) signal that is sent to Requestor 0. The ACK (3), ACK(2), ACK(1) and ACK(0) signals form the Acknowledge Vector.

Simple alteration of the contents of shift registers 310–313 (i.e., one-hot Arbiter Registers 0–3) modifies the priorities of Requestor 3, Requestor 2, Requestor 1, and Requestor 0. The load (LD) and shift control signals for shift registers 310–313 may be used to alter the contents of shift registers 310–313. For example, the SHIFT3 shift signal may be used to right shift or left shift Arbiter Register 3. During a left shift, the leftmost (i.e., most significant) priority bit wraps around and shifts into the rightmost (i.e., least significant) bit position. Conversely, during a right shift, the rightmost (i.e., least significant) priority bit wraps around and shifts into the leftmost (i.e., most significant) bit position. Arbiter Registers 0, 1 and 2 operate in similar manners.

FIGS. 4A and 4B illustrate a round robin priority algorithm implemented by the programmable bus arbiter according to the principles of the present invention. In FIG. 4A, the N×N-bit array implements the priority scheme described above in FIGS. 3A and 3B. That is, Requestor 3 has the highest priority, as indicated by Arbiter Register 3 (AR3), Requestor 2 has the second highest priority, as indicated by Arbiter Register 2 (AR2), Requestor 1 has the third highest priority, as indicated by Arbiter Register 1 (AR1), and Requestor 0 has the lowest priority, as indicated by Arbiter Register 0 (AR0).

However, left-shifting each of AR3, AR2, AR1 and AR0 produces the N×N-bit array illustrated in FIG. 4B. In FIG. 4B, Requestor 2 has the highest priority, as indicated by Arbiter Register 2 (AR2), Requestor 1 has the second highest priority, as indicated by Arbiter Register 1 (AR1), Requestor 0 has the third highest priority, as indicated by Arbiter Register 0 (AR0), and Requestor 3 has the lowest priority, as indicated by Arbiter Register 3 (AR3). Continuing to left-shift AR3, AR2, AR1 and AR0 causes each of AR3, AR2, AR1 and AR0 to have the highest priority in turn. This is a round-robin priority algorithm.

The shift register scheme described above allows the bus arbiter to be reprogrammed using simple shift commands and/or load commands. For example, a round-robin scheme can be implemented simply by rotating the one-hot values around in the shift register array. It also is possible to use the shift register functions to change the priorities of only some or the requesters, while leaving the shift registers of other requesters unchanged, thereby establishing a static priority for some requesters. Thus, a static group of requesters may have fixed priorities while a dynamic group of requesters may implement a round-robin scheme strictly within the dynamic group. Advantageously, an arbiter according to the principles of the present invention may be dynamically reconfigured in software in order to implement different arbitration algorithms for different applications.

However, those skilled in the art will recognize that the embodiment depicted in FIGS. 3A and 3B may readily be modified in alternate embodiments of the present invention. What is important is that the priority bits in bus arbiter 220 be represented in "one-hot" format when applied to the inputs of AND gate arrays 320–323 and that the one-hot priority bits be easily modifiable. In that regard, shift registers 310–313 may be replaced by a number of other circuits that can perform the same function.

Figure 6:
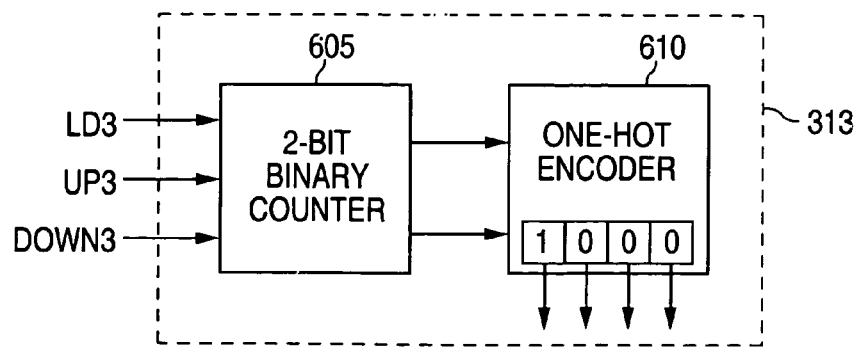
FIG. 6 illustrates the Arbiter Registers in FIG. 3 according to an alternate embodiment of the present invention.

For example, FIG. 6 illustrates Arbiter Register 3 in FIG. 3 according to an alternate embodiment of the present invention. The alternate embodiment does not require a shift register. Instead, two-bit (2-bit) binary counter 605 and one-hot encoder 610 replace shift register 313. Two-bit binary counter 605 stores a 2-bit binary value that may be loaded into two-bit binary counter 605 using the load signal, LD3. The 2-bit value stored in two-bit binary counter 605 may be incremented by the UP3 signal and may be decremented by the DOWN3 signal.

The two binary bits, [B1 B0], stored in two-bit binary counter 605 are converted to four one-hot bits, [H3 H2 H1 H0] by one-hot encoder 610. The one-hot output of one-hot encoder 610 may be "shifted" left by incrementing two-bit binary counter 605. The one-hot output of one-hot encoder 610 may be "shifted" right by decrementing two-bit binary counter 605. The one-hot output of one-hot encoder 610 may also jump from a current value to a new, non-sequential value by loading the new value into two-bit binary counter 605 using the LD3 load signal.

Exemplary one-hot encoder 610 may be implemented using AND gates and inverters according to the following logic:

H3=B1 AND B0;
H2=BE1 AND B0*;
H1=B1* AND B0; and
H0=B1* AND B0*, where "*" denotes an inverted logic value.

The present invention provides numerous advantages over the prior art. The improved bus arbiter design may be made much simpler and more compact than the prior art state-machine designs typically used for dynamic arbitration. A bus arbiter according to the present invention is dynamically reprogrammable and may implement multiple arbitration schemes within a single physical structure.

Although the present invention has been described with an exemplary embodiment, various changes and modifications may be suggested to one skilled in the art. It is intended that the present invention encompass such changes and modifications as fall within the scope of the appended claims.

What is claimed is:

1. A bus arbiter for arbitrating bus access requests from N bus requestor devices, said bus arbiter comprising:

N one-hot registers, each of said N one-hot registers associated with a corresponding one of said N bus requestor devices, wherein said each of said N one-hot registers contains N priority bits rank-ordered from a lowest priority bit to a highest priority bit, and wherein only one of said N priority bits is enabled to indicate a priority of said corresponding one of said N bus requestor device; and N AND gate arrays, each of said N AND gate arrays associated with a corresponding one of said N one-hot registers, wherein said each AND gate array comprises N two-input AND gates, each of said N two-input AND gates having 1) a first input coupled to one of N priority bits of said corresponding one of said N one-hot registers and 2) a second input coupled to a request line associated with said corresponding one of said N bus requestor devices, and wherein said each AND gate array produces a request vector comprising N rank-ordered bits such that only one of said N rank-ordered bits in each request vector is enabled when said request line is enabled.

2. The bus arbiter as set forth in claim 1 wherein each enabled priority bit in each of said N one-hot registers has a different priority rank than the other enabled priority bits.

3. The bus arbiter as set forth in claim 2 further comprising N OR gates, each of said N OR gates having N inputs and an output, wherein each of said N OR gates has one input coupled to one of said N rank-ordered bits from each of said N AMD gate arrays such that all N inputs of said each OR gate receive N outputs having the same rank ordering from the N AND gate arrays.

4. The bus arbiter as set forth in claim 3 her comprising a priority encoder having N inputs and N outputs, wherein each of said N priority encoder inputs is coupled to an output of one of said N OR gates.

5. The bus arbiter as set forth in claim 4 wherein said priority encoder determines which of said N OR gate outputs are enabled and enables only one of said N priority encoder outputs corresponding to a highest priority one of said enabled OR gate outputs.

6. The bus arbiter as set forth in claim 5 wherein a priority of a, first one of said N bus requestor devices may be modified by modifying said N priority bits of a first one of said N one-hot registers associated with said first bus requestor device.

7. The bus arbiter as set forth in claim 6 wherein said N priority bits of said first one-hot register may be modified by left-shifting said N priority bits of said first one-hot register.

8. The bus arbiter as set forth in claim 6 wherein said N priority bits of said first one-hot register may be modified by right-shifting said N priority bits of said first one-hot register.

9. The bus arbiter as set forth in claim 6 wherein said N priority bits of said first one-hot register may be modified by loading N new priority bits into said first one-hot register.

10. The bus arbiter as set forth in claim 6 wherein said N priority bits of said first one-hot register may be modified by at least one of left-shifting and right-shifting said N priority bits and wherein said first one-hot register may be shifted independently of a second one of said N one-hot registers.

11. An integrated circuit device comprising:

N bus requester devices capable of transferring data between one another; and a bus interface unit for transferring data between said N bus requestor devices, said bus interface unit comprising a bus arbiter for arbitrating bus access requests from N bus requestor devices, wherein said bus arbiter comprises:

N one-hot registers, each of said N one-hot registers associated with a corresponding one of said N bus requestor devices, wherein said each of said N one-hot registers contains N priority bits rank-ordered from a lowest priority bit to a highest priority bit, and wherein only one of said N priority bits is enabled to indicate a priority of said corresponding one of said N bus requestor device; and N AND gate arrays, each of said N AND gate arrays associated with a corresponding one of said N one-hot registers, wherein said each AND gate array comprises N two-input AND gates, each of said N two-input AND gates having 1) a first input coupled to one of N priority bits of said corresponding one of said N one-hot registers and 25 a second input coupled to a request line associated with said corresponding one of said N bus requestor devices, and wherein said each AND gate array produces a request vector comprising N rank-ordered bits such that only one of said N rank-ordered bits of said each AND gate array is enabled when said request line is enabled.

12. The integrated circuit device as set forth in claim 11 wherein each enabled priority bit in each of said N one-hot registers has a different priority rank than the other enabled priority bits.

13. The integrated circuit device as set forth in claim 12 further comprising N OR gates, each of said N OR gates having N inputs and an output, wherein each of said N OR gates has one input coupled to one of said N rank-ordered bits from each of said N AND gate arrays such that all N inputs of said each OR gate receive N outputs having the same rank ordering from the N AND gate arrays.

14. The integrated circuit device as set forth in claim 13 further comprising a priority encoder having N inputs and N outputs, wherein each of said N priority encoder inputs is coupled to an output of one of said N OR gates.

15. The integrated circuit device as set forth in claim 14 wherein said priority encoder determines which of said N OR gate outputs are enabled and enables only one of said N priority encoder outputs corresponding to a highest priority one of said enabled OR gate outputs.

16. The integrated circuit device as set forth in claim 15 wherein a priority of a first one of said N bus requestor devices may be modified by modifying said N priority bits of a first one of said N one-hot registers associated with said first bus requestor device.

17. The integrated circuit device as set forth in claim 16 wherein said N priority bits of said first one-hot register may be modified by left-shifting said N priority bits of said first one-hot register.

18. The integrated circuit device as set forth in claim 16 wherein said N priority bits of said first one-hot register may be modified by right-shifting said N priority bits of said first one-hot register.

19. The integrated circuit device as set forth in claim 16 wherein said N priority bits of said first one-hot register may be modified by loading N new priority bits into said first one-hot register.

20. The integrated circuit device as set forth in claim 16 wherein said N priority bits of said first one-hot register may be modified by at least one of left-shifting and right-shifting said N priority bits and wherein said first one-hot register may be shifted independently of a second one of said N one-hot registers.

* * * * *

UNITED STATES PATENT AND TRADEMARK OFFICE
CERTIFICATE OF CORRECTION

PATENT NO.         : 6,978,329 B1                                            Page 1 of 1
APPLICATION NO. : 10/267401
DATED              : December 20, 2005
INVENTOR(S)        : Vance Harral It is certified that error appears in the above-identified patent and that said Letters Patent is hereby corrected as shown below:

Column 9, line 27:   Please change "her" to "further"

Column 9, line 57:   Please change "requester" to "requestor"

Signed and Sealed this

Twenty-second Day of August, 2006

JON W. DUDAS
*Director of the United States Patent and Trademark Office*